United States Patent
Gim et al.

(10) Patent No.: US 12,429,733 B2
(45) Date of Patent: Sep. 30, 2025

(54) LIGHT MODULATING DEVICE

(71) Applicant: LG Chem, Ltd., Seoul (KR)

(72) Inventors: Min Jun Gim, Daejeon (KR); Sergey Belyaev, Daejeon (KR); Dong Hyun Oh, Daejeon (KR); Jung Sun You, Daejeon (KR); Jin Hong Kim, Daejeon (KR); Jung Woon Kim, Daejeon (KR); Han Min Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/010,262

(22) PCT Filed: Jul. 22, 2021

(86) PCT No.: PCT/KR2021/009489
§ 371 (c)(1),
(2) Date: Dec. 14, 2022

(87) PCT Pub. No.: WO2022/019679
PCT Pub. Date: Jan. 27, 2022

(65) Prior Publication Data
US 2023/0305338 A1 Sep. 28, 2023

(30) Foreign Application Priority Data
Jul. 24, 2020 (KR) .......... 10-2020-0092376

(51) Int. Cl.
*G02F 1/13363* (2006.01)
*B60J 3/04* (2006.01)
(Continued)

(52) U.S. Cl.
CPC .......... *G02F 1/133638* (2021.01); *B60J 3/04* (2013.01); *G02F 1/133531* (2021.01);
(Continued)

(58) Field of Classification Search
CPC ......... G02F 1/133638; G02F 1/133531; G02F 1/133742; G02F 1/133726; G02F 1/133634; G02F 1/13394; G02F 1/1396
(Continued)

(56) References Cited

U.S. PATENT DOCUMENTS

2004/0207594 A1 10/2004 Kubo
2007/0146568 A1 6/2007 Yamazaki et al.
(Continued)

FOREIGN PATENT DOCUMENTS

CN 1977192 A 6/2007
CN 107430301 A 12/2017
(Continued)

OTHER PUBLICATIONS

International Search Report for Application No. PCT/KR2021/009489 mailed Nov. 1, 2021, pp. 1-5.
(Continued)

*Primary Examiner* — Michael H Caley
*Assistant Examiner* — William D Peterson
(74) *Attorney, Agent, or Firm* — Lerner David LLP

(57) ABSTRACT

A light modulating device is disclosed herein. In some embodiments, a light modulating device includes a first substrate, a second substrate, a light modulation layer, and a retardation film, wherein each of the first and second substrates has a first surface and a second surface, wherein the first and second surfaces are disposed opposite to each other, wherein the first surfaces of the first and second substrates face each other, wherein the light modulation layer is disposed between the first and second substrates, wherein the retardation film is formed on the second surface of the first substrate or the second substrate, and wherein the retardation film has an in-plane phase difference in a range of 100 nm to 300 nm for light having a wavelength of 550
(Continued)

nm. The light modulating device can be control omnidirectional light leakage in a black mode while having excellent optical properties and mechanical properties.

15 Claims, 4 Drawing Sheets

(51) Int. Cl.
*G02F 1/1335* (2006.01)
*G02F 1/1337* (2006.01)
G02F 1/1339 (2006.01)
G02F 1/139 (2006.01)

(52) U.S. Cl.
CPC .. *G02F 1/133634* (2013.01); *G02F 1/133726* (2021.01); *G02F 1/133742* (2021.01); *G02F 1/13394* (2013.01); *G02F 1/1396* (2013.01); *G02F 2202/28* (2013.01); *G02F 2413/02* (2013.01); *G02F 2413/05* (2013.01); *G02F 2413/06* (2013.01); *G02F 2413/08* (2013.01); *G02F 2413/14* (2013.01)

(58) Field of Classification Search
USPC .......................................................... 349/16
See application file for complete search history.

(56) References Cited

U.S. PATENT DOCUMENTS

| 2007/0242188 | A1  |    | 10/2007 | Sakai           |              |
|--------------|-----|----|---------|-----------------|--------------|
| 2009/0115958 | A1  | *  | 5/2009  | Kurihara ............. | G02F 1/13718 |
|              |     |    |         |                 | 349/179      |
| 2011/0134375 | A1  |    | 6/2011  | Takigawa et al. |              |
| 2013/0050614 | A1  | *  | 2/2013  | Inoue .................. | G02B 5/3025  |
|              |     |    |         |                 | 349/62       |
| 2016/0062165 | A1  | *  | 3/2016  | Kang ................ | G02F 1/133634 |
|              |     |    |         |                 | 349/96       |
| 2016/0313590 | A1  | *  | 10/2016 | Kang ................ | G02F 1/133528 |
| 2018/0074377 | A1  |    | 3/2018  | You et al.      |              |
| 2019/0250319 | A1  | *  | 8/2019  | Kong ................ | G02F 1/133632 |
| 2019/0384094 | A1  | *  | 12/2019 | Lee ..................... | G02F 1/13475 |
| 2020/0142246 | A1  |    | 5/2020  | Gim et al.      |              |
| 2021/0240012 | A1  |    | 8/2021  | Lim et al.      |              |

FOREIGN PATENT DOCUMENTS

| CN | 110161609   | A  |   | 8/2019  |
|----|-------------|----|---|---------|
| CN | 110546553   | A  |   | 12/2019 |
| JP | H06230408   | A  |   | 8/1994  |
| JP | H10153802   | A  |   | 6/1998  |
| JP | 2001264807  | A  |   | 9/2001  |
| JP | 2009229894  | A  |   | 10/2009 |
| JP | 2010039281  | A  |   | 2/2010  |
| JP | 2010072381  | A  |   | 4/2010  |
| JP | 2017198750  | A  |   | 11/2017 |
| JP | 2018507443  | A  |   | 3/2018  |
| JP | 2019070779  | A  |   | 5/2019  |
| JP | 2020517987  | A  |   | 6/2020  |
| KR | 100624586   | B1 |   | 9/2006  |
| KR | 20160001871 | A  |   | 1/2016  |
| KR | 20160146566 | A  | * | 12/2016 |
| KR | 20170074581 | A  |   | 6/2017  |
| KR | 20180121425 | A  |   | 11/2018 |
| KR | 20200050750 | A  |   | 5/2020  |
| KR | 20200051267 | A  |   | 5/2020  |
| TW | M499730     | U  |   | 4/2015  |
| TW | 201702703   | A  |   | 1/2017  |
| WO | 2020050612  | A1 |   | 3/2020  |

OTHER PUBLICATIONS

Search Report from the Office Action for Taiwanese Application No. 110127022 issued May 24, 2022, 1 page. [See p. 1, categorizing the cited references].
Extended European Search Report including Written Opinion for Application No. 21847098.7 dated Jan. 2, 2024, pp. 1-9.

* cited by examiner

[Figure 1]
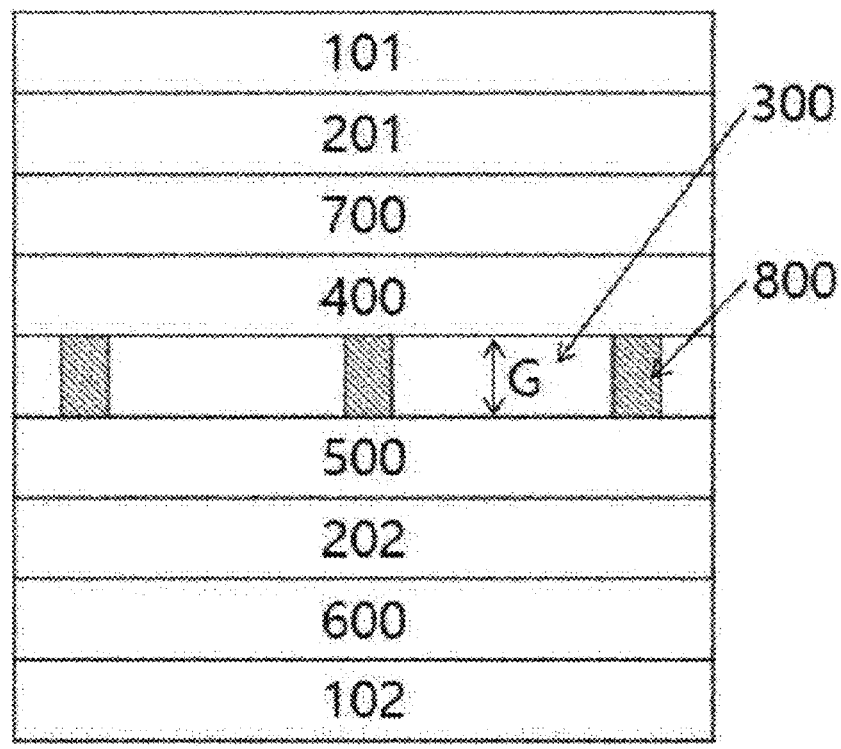

[Figure 2]
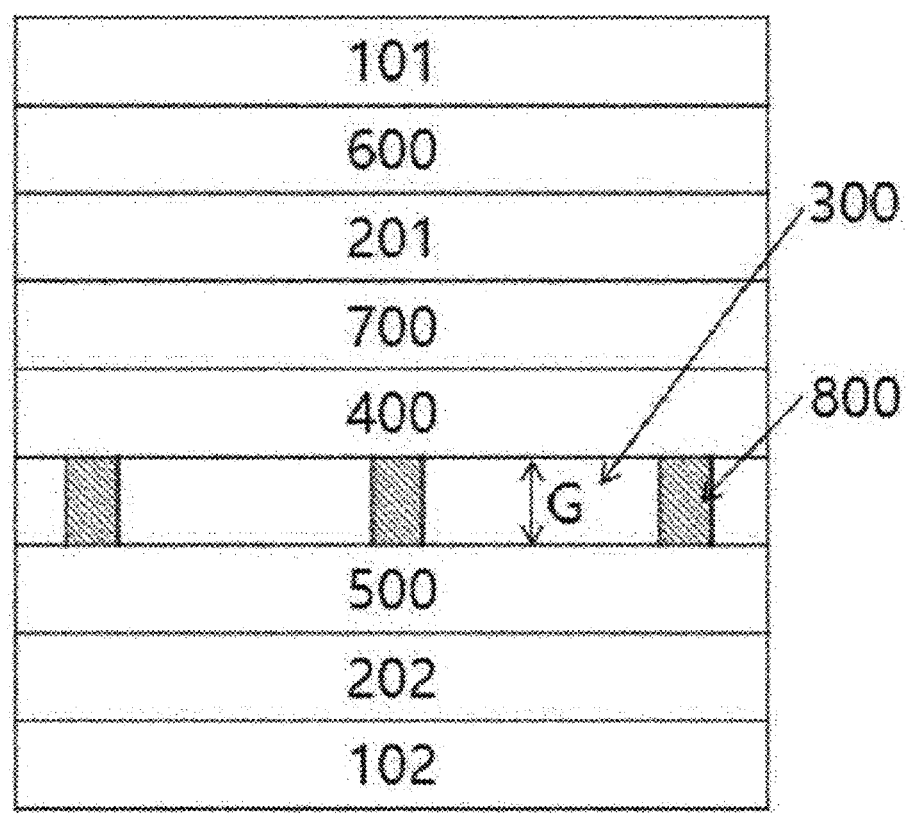

[Figure 3]
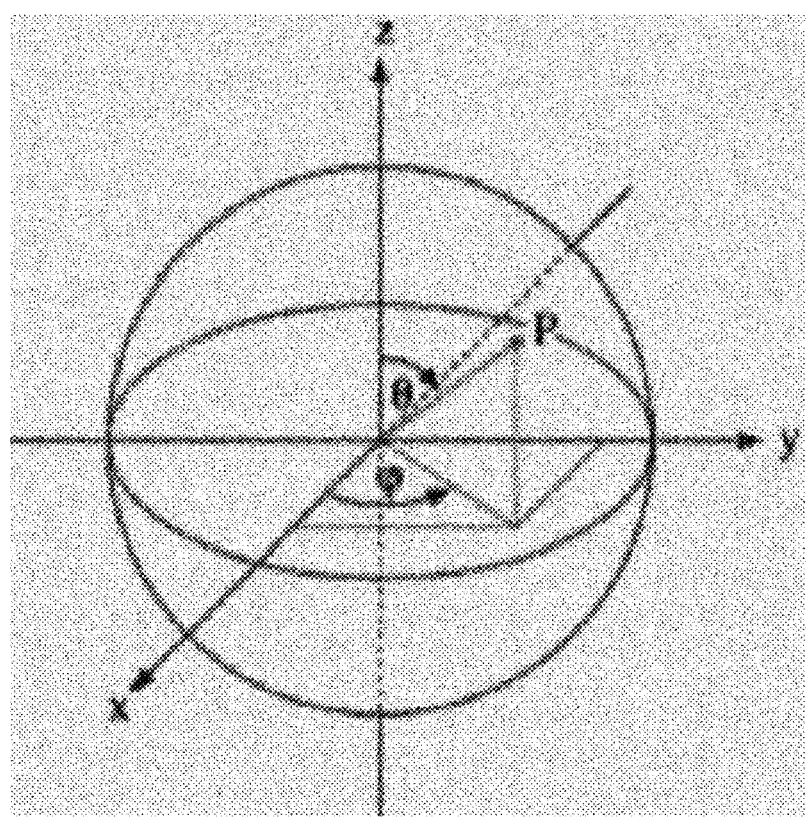

[Figure 4]
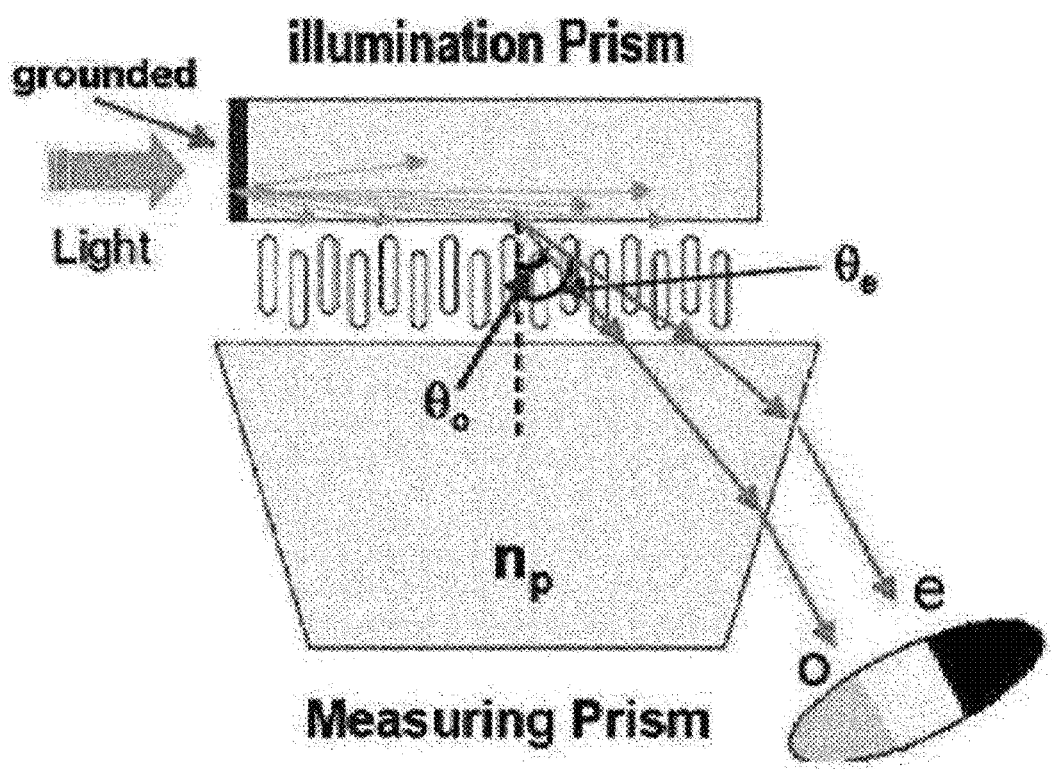

LIGHT MODULATING DEVICE

CROSS-REFERENCE TO RELATED APPLICATIONS

This application is a national phase entry under 35 U.S.C. § 371 of International Application No. PCT/KR2021/009489, filed on Jul. 22, 2021, which claims priority from Korean Patent Application No. 10-2020-0092376, filed on Jul. 24, 2020, the disclosures of which are incorporated by reference herein.

TECHNICAL FIELD

The present disclosure relates to a light modulating device.

BACKGROUND ART

A light modulating device is a device capable of switching between at least two or more different states. With respect to such a light modulating device, a polymer film base material is recently applied to relatively facilitate implementation of a flexible element and application of a roll-to-roll process, and the like.

At this time, when an isotropic film base material is used as the polymer film, there is a problem such as weak mechanical strength, occurrence of cracks, or occurrence of shrinkage and the like due to heat.

BRIEF DESCRIPTION OF DRAWINGS

FIGS. 1 and 2 are schematic diagrams of exemplary light modulating devices of the present disclosure.

FIG. 3 is a schematic diagram for explaining an inclination angle and a radial angle.

FIG. 4 is a diagram showing a method for evaluating refractive index anisotropy.

DISCLOSURE

Technical Problem

However, the light modulating device to which an anisotropic film base material is introduced has a problem that the driving performance of the device decreases due to the phase difference of the film base material. For example, there is a problem such as light leakage to the side of the light modulating device in the black mode.

Therefore, it is one object of the present disclosure to provide a light modulating device applicable to various applications by controlling omnidirectional light leakage in a black mode while having excellent optical properties such as transmittance variable properties and mechanical properties, and the like.

Technical Solution

The angle defined herein should be understood in consideration of errors such as manufacturing errors or variations. For example, in this specification, the term vertical, horizontal, orthogonal, parallel or angular numerical values, and the like means substantially vertical, horizontal, orthogonal, parallel or angular numerical values in a range that does not impair the purpose and effect, and for example, each case may include an error within about ±15 degrees, an error within about ±14 degrees, an error within about ±13 degrees, an error within about ±12 degrees, an error within about ±11 degrees, an error within about ±10 degrees, an error within about ±9 degrees, an error within about ±8 degrees, an error within about ±7 degrees, an error within about ±6 degrees, an error within about ±5 degrees, an error within about ±4 degrees, an error within about ±3 degrees, an error within about ±2 degrees, an error within about ±1 degree, or an error within about ±0.5 degrees.

Among physical properties mentioned in this specification, when the measurement temperature affects the relevant physical property, the physical property is a physical property measured at room temperature, unless otherwise specified.

In this specification, the term room temperature is a temperature in a natural state that is not particularly warmed or decreased, which may mean any one temperature in a range of about 10° C. to 30° C., for example, a temperature of about 15° C. or more, 18° C. or more, 20° C. or more, or about 23° C. or more, and about 27° C. or less. In addition, unless otherwise specified, the unit of temperature referred to in this specification is ° C.

In this specification, the in-plane phase difference (Rin) may mean a value calculated by Equation 4 below, and the thickness direction phase difference (Rth) may mean a value calculated by Equation 5 below.

$$Rin = d \times (nx - ny) \qquad \text{[Equation 4]}$$

$$Rth = d \times (nz - ny) \qquad \text{[Equation 5]}$$

In Equations 4 and 5, Rin may be an in-plane phase difference, Rth may be a thickness direction phase difference, d may be a thickness of a layer, nx may be the refractive index of the layer in the slow axis direction, and ny may be the refractive index in the in-plane direction orthogonal to the slow axis direction as the refractive index of the layer in the fast axis direction, and nz may be the refractive index of the layer in the thickness direction.

Here, the term layer is a layer of a measurement object for the in-plane phase difference and/or the thickness direction phase difference. The layer may be, for example, a polarization layer, a polymer film, a retardation film, an optically anisotropic layer, or a light modulation layer.

The term inclination angle mentioned in this specification is defined as follows, unless otherwise specified. In FIG. 3, when the plane formed by the x-axis and y-axis is a reference plane (for example, the reference plane may be a surface of a polarization layer, a polymer film, a retardation film, an optically anisotropic layer, or a light modulation layer of a light modulating device), the angle formed as in FIG. 3 with respect to the z-axis, which is the normal of the reference plane, is defined as an inclination angle (in FIG. 3, the inclination angle at point P is Θ). In FIG. 3, when the plane formed by the x-axis and y-axis is a reference plane (for example, the reference plane may be a surface of a polarization layer, a polymer film, a retardation film, an optically anisotropic layer or a light modulation layer, and the like in a light modulating device) and then the x-axis of the reference plane is set to 0 degrees, the angle formed as in FIG. 3 with respect to the relevant x-axis is defined as a radial angle (in FIG. 3, the radial angle at point P is Φ). Here, the x-axis of the reference plane may mean, for example, the axis in the horizontal direction of the reference plane.

The phase difference, refractive index, refractive index anisotropy and transmittance, and the like mentioned in this specification are physical quantities for light having a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

The present disclosure relates to, for example, a light modulating device comprising first and second substrates each having a first surface and a second surface, and oppositely disposed such that their first surfaces face each other, and a light modulation layer existing between the first and second substrates. A retardation film having an in-plane phase difference for light with a wavelength of 550 nm in a range of 100 nm to 300 nm may be formed on the second surface of the first substrate or the second substrate. In this specification, for example, the first surface may mean any one of the major surface of the layer and the opposite surface, and the second surface may mean the other surface of the major surface of the layer and the opposite surface. In another example herein, the first surface may mean a direction toward the light modulation layer among the respective layers, and the second surface may mean a direction opposite to the first surface. In this specification, the layer may be, for example, a first substrate, a second substrate, a retardation film, an optically anisotropic layer, an adhesive layer (or a pressure-sensitive adhesive layer), a liquid crystal alignment film and/or a polarization layer, and the like.

The light modulating device of the present disclosure may comprise, for example, a retardation film on the second surface of the first substrate or the second substrate. The retardation film may be disposed on only one of the second surface of the first substrate or the second surface of the second substrate.

The retardation film may have, for example, an in-plane phase difference for light with a wavelength of 550 nm in a range of 100 nm to 300 nm. In another example, the in-plane phase difference may be 105 nm or more, 110 nm or more, 115 nm or more, 120 nm or more, 125 nm or more, 130 nm or more, 135 nm or more, 140 nm or more, 145 nm or more, 150 nm or more, 155 nm or more, 160 nm or more, 165 nm or more, 170 nm or more, 175 nm or more, 180 nm or more, 185 nm or more, 190 nm or more, 195 nm or more, 200 nm or more, 205 nm or more, 210 nm or more, 215 nm or more, 220 nm or more, 225 nm or more, 230 nm or more, 235 nm or more, 240 nm or more, 245 nm or more, 250 nm or more, 255 nm or more, 260 nm or more, 265 nm or more, or 270 nm or more, or may be 295 nm or less, 290 nm or less, 285 nm or less, or 280 nm or less.

In the retardation film, for example, the thickness direction phase difference for light with a wavelength of 550 nm may be approximately 0 nm or have a value exceeding 0 nm. In this specification, the fact that the thickness direction phase difference for light with a wavelength of 550 nm may be approximately 0 nm or have a value exceeding 0 nm may mean, with respect to 0 nm or a value exceeding 0 nm, including a value having an error of ±5 nm, ±4 nm, ±3 nm, ±2 nm, ±1 nm, ±0.9 nm, ±0.8 nm, ±0.7 nm, ±0.6 nm, ±0.5 nm, ±0.4 nm, ±0.3 nm, ±0.2 nm or ±0.1 nm.

The light modulating device of the present disclosure may control omnidirectional light leakage in the black mode by introducing a retardation film having such an in-plane phase difference and/or having characteristics to be described below at an appropriate position.

The retardation film may be, for example, a film satisfying Equation 1 or Equation 2 below.

$$nx > ny \approx nz \quad \text{[Equation 1]}$$

$$nx \approx nz > ny \quad \text{[Equation 2]}$$

In Equations 1 and 2, nx may be the refractive index of the retardation film for light with a wavelength of 550 nm in the slow axis direction, ny may be the refractive index of the retardation film for light with a wavelength of 550 nm in the fast axis direction, and nz may be the refractive index of the retardation film in the thickness direction.

In this specification, $\approx$ may mean substantially the same.

The retardation film may be, for example, an HWP (half-wave plate) or a QWP (quarter-wave plate). In this specification, the term HWP means a wave plate having a half-wave phase retardation characteristic, and the term QWP means a wave plate having a quarter-wave phase retardation characteristic. In this specification, the n-wave phase retardation characteristic means a characteristic capable of retarding incident light by n times the wavelength of the incident light within at least a partial wavelength range. Therefore, the ½-wave phase retardation characteristic may mean a characteristic capable of retarding incident light by ½ times the wavelength of the incident light within at least a partial wavelength range, and the ¼-wave phase retardation characteristic may mean a characteristic capable of retarding incident light by ¼ times the wavelength of the incident light within at least a partial wavelength range.

The retardation film may have, for example, a thickness within the range of 20 μm to 70 μm, and in another example, it may be 21 μm or more, 22 μm or more, 23 μm or more, 24 μm or more, 25 μm or more, 26 μm or more, 27 μm or more, 28 μm or more, 29 μm or more, 30 μm or more, 31 μm or more, 32 μm or more, 33 μm or more, 34 μm or more, 35 μm or more, 36 μm or more, 37 μm or more, 38 μm or more, 39 μm or more, 40 μm or more, 41 μm or more, 42 μm or more, 43 μm or more, or 44 μm or more, or may be 69 μm or less, 68 μm or less, 67 μm or less, 66 μm or less, 65 μm or less, 64 μm or less, 63 μm or less, 62 μm or less, 61 μm or less, 60 μm or less, 59 μm or less, 58 μm or less, 57 μm or less, 56 μm or less, 55 μm or less, 54 μm or less, 53 μm or less, 52 μm or less, 51 μm or less, 50 μm or less, 49 μm or less, 48 μm or less, 47 μm or less, or 46 μm or less, but is not limited thereto.

The retardation film may have, for example, refractive index anisotropy ($\Delta n$) in a range of 0.1 to 1.5. The refractive index anisotropy ($\Delta n$) of the present disclosure may be a difference (ne-no) between an extraordinary refractive index (ne) and an ordinary refractive index (no). In this specification, the ne may be, for example, nz, and the no may be, for example, nx and/or ny. That is, in the present disclosure, the refractive index anisotropy ($\Delta n$) may be, for example, nz–nx or nz–ny. In another example, the refractive index anisotropy ($\Delta n$) may be 0.2 or more, 0.3 or more, 0.4 or more, 0.5 or more, or 0.6 or more, or may be 1.4 or less, 1.3 or less, 1.2 or less, 1.1 or less, 1.0 or less, 0.9 or less, or 0.8 or less.

The retardation film may also have, for example, an average refractive index in a range of 1.0 to 2.0. The average refractive index of the present disclosure may mean an average value ((ne+no)/2) of the extraordinary refractive index (ne) and the ordinary refractive index (no). In this specification, the average refractive index may be, for example, $(nx+nz)/2$ or $(ny+nz)/2$. In another example, the average refractive index may be 1.1 or more, 1.2 or more, 1.3 or more, 1.4 or more, or 1.5 or more, or may be 1.9 or less, 1.8 or less, 1.7 or less, or 1.6 or less.

In the present disclosure, the extraordinary refractive index (ne) and the ordinary refractive index (no) can be identified using an Abbe refractometer, and the specific method follows the method disclosed in Evaluation Example 4 below.

The present disclosure can provide a light modulating device having a desired optical compensation effect, for example, an effect of controlling omnidirectional light leakage in the black mode, while having excellent mechanical properties and the like, by appropriately introducing a retardation film having an in-plane phase difference in the above range and/or satisfying Equation 1 or Equation 2, and the like at the above position.

The present inventors have confirmed that by disposing a retardation film having the above-described characteristics and an optically anisotropic layer having the characteristics to be described below at appropriate positions, it is possible to provide a light modulating device, in which omnidirectional light leakage in a black mode or the like is controlled to be applicable to various applications, while having excellent optical properties, such as transmittance variable characteristics, and mechanical properties.

The optically anisotropic layer may be included in at least one of, for example, positions between the light modulation layer and the first substrate and between the light modulation layer and the second substrate. In this specification, the fact that it may be included in at least one of positions between the light modulation layer and the first substrate and between the light modulation layer and the second substrate may mean that the optically anisotropic layers are each disposed between the light modulation layer and the first substrate and between the light modulation layer and the second substrate, or the optically anisotropic layer is disposed in any one of positions between the light modulation layer and the first substrate and between the light modulation layer and the second substrate.

The optically anisotropic layer may be, for example, a –C plate satisfying Equation 3 below.

$$nz < ny \approx nx \qquad \text{[Equation 3]}$$

In Equation 3, nx may be the refractive index of the optically anisotropic layer for light with a wavelength of 550 nm in the slow axis direction, ny may be the refractive index of the optically anisotropic layer for light with a wavelength of 550 nm in the fast axis direction, and nz may be the refractive index of the optically anisotropic layer in the thickness direction.

The optically anisotropic layer may have, for example, a thickness direction phase difference for light with a wavelength of 550 nm in a range of −100 nm to −350 nm. In another example, the thickness direction phase difference may be −110 nm or less, −120 nm or less, −130 nm or less, −140 nm or less, −150 nm or less, −160 nm or less, −170 nm or less, −180 nm or less, −190 nm or less, −200 nm or less, or −210 nm or less, or may be −340 nm or more, −330 nm or more, −320 nm or more, −310 nm or more, −300 nm or more, −290 nm or more, −280 nm or more, −270 nm or more, −260 nm or more, −250 nm or more, −240 nm or more, or −230 nm or more.

The optically anisotropic layer may have, for example, an in-plane phase difference for light with a wavelength of 550 nm in a range of 10 nm or less. In another example, the in-plane phase difference may be 9 nm or less, 8 nm or less, 7 nm or less, 6 nm or less, 5 nm or less, 4 nm or less, 3 nm or less, 2 nm or less, or 1 nm or less, and preferably may be 0 nm.

In the present disclosure, if the optically anisotropic layer exhibits the above properties, a liquid crystal film or a polymer film that is commonly used may be applied without limitation. In one example, the optically anisotropic layer may be formed by formulating polyamide in a solvent. In one example, the polyamide may be formed by polymerizing 2,2'-bis(trifluoromethyl)-5,5'-biphenyldiamine with isophthalic acid and/or terephthalic acid. Also, in one example, the solvent may be dimethylacetamide. The polyamide may be included, for example, in a range of approximately 4 weight % to 10 weight % relative to the solvent, and in another example, it may be included in an amount of 4.5 weight % or more, or 5 weight % or more, or 9 weight % or less, 8 weight % or less, 7 weight % or less, 6 weight % or less, or 5.5 weight % or less.

In one example, the solution formed by formulating polyamide in a solvent may be applied and coated on a polymer film or a conductive layer to be described below, which may be performed, for example, by a bar coating method, a slot-die coating method, a gravure coating method, or the like.

The coating layer formed by the coating may be cured by thermal curing or ultraviolet curing, and the like. In one example, the optically anisotropic layer of the present disclosure may be a layer formed by applying to the coating layer heat in a range of approximately 50° C. to 150° C. for a time in a range of approximately 5 minutes to 30 minutes to cure it. In another example, the curing temperature may be 60° C. or more, 70° C. or more, 80° C. or more, or 90° C. or more, or may be 140° C. or less, 130° C. or less, 120° C. or less, or 110° C. or less, and the curing time may be 6 minutes or more, 7 minutes or more, 8 minutes or more, or 9 minutes or more, or may be 25 minutes or less, 20 minutes or less, or 15 minutes or less or so, but is not limited thereto.

The optically anisotropic layer may have, for example, refractive index anisotropy ($\Delta n$) in a range of 0.01 to 0.15. In another example, the refractive index anisotropy ($\Delta n$) may be 0.02 or more, 0.03 or more, 0.04 or more, 0.05 or more, 0.06 or more, 0.07 or more, 0.08 or more, or 0.09 or more, or may be 0.14 or less, 0.13 or less, 0.12 or less, or 0.11 or less.

The optically anisotropic layer may also have, for example, an average refractive index in a range of 1.0 to 2.0. In another example, the average refractive index may be 1.1 or more, 1.2 or more, 1.3 or more, 1.4 or more, 1.5 or more, or 1.6 or more, or may be 1.9 or less, 1.8 or less, or 1.7 or less.

In the present disclosure, the optically anisotropic layer may have a thickness in a range of, for example, 0.1 µm to 10 µm. In another example, the thickness may be about 0.2 µm or more, about 0.3 µm or more, about 0.4 µm or more, about 0.5 µm or more, about 0.6 µm or more, about 0.7 µm or more, about 0.8 µm or more, about 0.9 µm or more, about 1 µm or more, about 1.1 µm or more, about 1.2 µm or more, about 1.3 µm or more, about 1.4 µm or more, about 1.5 µm or more, about 1.6 µm or more, about 1.7 µm or more, about 1.8 µm or more, or about 1.9 µm or more, or may be about 9 µm or less, about 8 µm or less, about 7 µm or less, about 6 µm or less, about 5 µm or less, about 4 µm or less, or about 3 µm or less.

While the present disclosure controls the light leakage to the side in the black mode by arranging the retardation film and/or the optically anisotropic layer having the above characteristics at an appropriate position of the light modulating device, it can also solve a problem, in which that a compensation effect is distorted, by the optical properties of the polymer film substrate to be described below.

In the present disclosure, the first and/or second substrate may be a polymer film. The polymer film may be isotropic or anisotropic, but it may preferably be an anisotropic polymer film from the viewpoint of mechanical strength, crack generation control or heat shrinkage control, and the like.

The first and/or the second polymer film may each have, for example, an in-plane phase difference of 500 nm or more for a wavelength of 550 nm. In another example, the in-plane phase difference may be 1000 nm or more, 2000 nm or more, 3000 nm or more, 4000 nm or more, 5000 nm or more, 6000 nm or more, 7000 nm or more, 8000 nm or more, 9000 nm or more, or 10000 nm or more, or may be 50000 nm or less, 40000 nm or less, 30000 nm or less, 20000 nm or less, or 15000 nm or less, but is not limited thereto.

The first and/or second polymer film may each have, for example, a thickness direction phase difference of 3000 nm or less for a wavelength of 550 nm. In another example, the thickness direction phase difference may be 2900 nm or less, 2800 nm or less, 2700 nm or less, 2600 nm or less, 2500 nm or less, 2400 nm or less, 2300 nm or less, 2200 nm or less, 2100 nm or less, 2000 nm or less, 1900 nm or less, 1800 nm or less, 1700 nm or less, 1600 nm or less, 1500 nm or less, 1400 nm or less, 1300 nm or less, 1200 nm or less, 1100 nm or less, or 1000 nm or less, or may be 100 nm or more, 200 nm or more, 300 nm or more, 400 nm or more, or 500 nm or less or so.

A film having a high phase difference as above is well known in the industry, and such a film exhibits large asymmetry in mechanical properties due to high elongation in the manufacturing process as well as large optical anisotropy. The retardation film known in the art may be, for example, a polyethylene terephthalate (PET) film, a cyclo-olefin polymer (COP) film, a cyclo-olefin copolymer (COC) film, polycarbonate (PC), a polypropylene (PP) film, a polysulfone (PSF) film or an acrylic (polymethylmethacrylate; PMMA) film, and the like, but is not limited thereto. In the present disclosure, the first and/or second polymer films may be the same or different, which may be appropriately selected from the known films in consideration of desired effects and the like.

In the present disclosure, the first and second polymer films may be selected such that the value of P in Equation 6 below satisfies 0.3 or more in terms of maximizing effects such as control of a rainbow phenomenon.

$$P = \frac{|W_A - W_B|}{\min(W_A, W_B)} \qquad \text{[Equation 6]}$$

In P of Equation 6, WA may mean the thickness of the first substrate, WB may mean the thickness of the second substrate, and min(WA, WB) may mean the smaller value of WA or WB. In another example, the P value of Equation 6 may be less than 1, less than 0.95, less than 0.9, less than 0.85, or less than 0.8, or may be 0.35 or more, 0.4 or more, 0.45 or more, 0.5 or more, 0.55 or more, 0.6 or more, 0.65 or more, or 0.7 or more, but is not limited thereto.

In the present disclosure, the WA value in P of Equation 6 may be, for example, in a range of 50 µm to 100 µm. In another example, the WA value may be 55 µm or more, 60 µm or more, 65 µm or more, 70 µm or more, or 75 µm or more, or may be 95 µm or less, 90 µm or less, or 85 µm or less. In the present disclosure, the WB value in P of Equation 6 may be, for example, in a range of 120 µm to 180 µm. In another example, the WB value may be 125 µm or more, 130 µm or more, or 135 µm or more, or 140 µm or more, or may be 175 µm or less, 170 µm or less, 165 µm or less, 160 µm or less, 155 µm or less, or 150 µm or less.

The present disclosure can provide a light modulating device applicable to various applications by controlling omnidirectional light leakage in the black mode while having excellent optical properties, such as transmittance variable characteristics, and mechanical properties, by introducing a polymer film having, for example, the in-plane phase difference, thickness, and the like as described above as the first and/or second polymer film and simultaneously disposing the retardation film and/or the optically anisotropic layer having the above-described characteristics in an appropriate position.

The present disclosure may further comprise, for example, a polarization layer formed on one or more of the second surfaces of the first and/or second substrates. In the present disclosure, the polarization layer may be formed only on the second surface of the first substrate, only on the second surface of the second substrate, or on both the second surfaces of the first and second substrates, and preferably, it may be formed on each of the second surfaces of the first and second substrates.

In this specification, the polarization layer may mean an element that converts natural light or non-polarized light into polarized light. For example, the polarization layer may be a linear polarization layer. In this specification, the linear polarization layer means a case where the selectively transmitted light is linearly polarized light vibrating in any one direction and the selectively absorbed or reflected light is linearly polarized light vibrating in a direction orthogonal to the vibration direction of the linearly polarized light. That is, the linear polarizer may have a transmission axis and an absorption axis or a reflection axis which are orthogonal to the plane direction.

The polarization layer may be an absorbing polarization layer or a reflecting polarization layer. As the absorbing polarization layer, for example, a polarization layer in which iodine is dyed on a polymeric stretched film such as a PVA (PVA means polyvinyl alcohol in this specification) stretched film or a guest-host type polarization layer in which liquid crystals polymerized in the oriented state are set as a host and an anisotropic dye arranged according to the orientation of the liquid crystals is set as a guest may be used, without being limited thereto. As the reflecting polarization layer, for example, a reflecting polarization layer known as a DBEF (dual brightness enhancement film) or a reflecting polarization layer formed by coating a liquid crystal compound such as LLC (lyotropic liquid crystal) may be used, without being limited thereto.

In the present disclosure, the polarization layer may have a thickness in the range of, for example, 80 µm to 200 µm. In another example, the thickness of the polarization layer may be 90 µm or more, 100 µm or more, 110 µm or more, 120 µm or more, or 130 µm or more, or may be 190 µm or less, 180 µm or less, 170 µm or less, 160 µm or less, or 150 µm or less.

In the present disclosure, the term light modulating device may mean a device capable of switching between at least two or more different states of light. Here, the different states of light may mean states where any one characteristic of at least transmittance, haze and color is different from each other. The light modulation layer may be present between the first and second substrates disposed opposite to each other, as described above.

In the present disclosure, the light modulation layer may mean, for example, a liquid crystal layer comprising a liquid crystal compound and capable of controlling the orientation state of the liquid crystal compound through application of an external signal, or the like. As the liquid crystal compound, any kind of liquid crystal compound may be used as long as its orientation direction can be changed by application of an external signal. As the liquid crystal compound, for example, a nematic liquid crystal compound, a smectic liquid crystal compound or a cholesteric liquid crystal compound, and the like may be used. In addition, the liquid crystal compound may be, for example, a compound without any polymerizable group or crosslinkable group, or a compound in a non-polymerized or non-crosslinked state even if it has a polymerizable group or a crosslinkable group, so that the orientation direction can be changed by the application of an external signal.

The light modulation layer may comprise, for example, a liquid crystal compound whose dielectric constant anisotropy is negative, or the light modulation layer may exhibit the dielectric constant anisotropy mentioned above. The absolute value of the dielectric constant anisotropy can be appropriately selected in consideration of the object of the present disclosure. The term "dielectric constant anisotropy ($\Delta\varepsilon$)" may mean a difference ($\varepsilon//-\varepsilon\perp$) between the horizontal dielectric constant ($\varepsilon//$) and the vertical dielectric constant ($\varepsilon\perp$). In this specification, the term horizontal dielectric constant ($\varepsilon//$) means a dielectric constant value measured along the direction of an electric field in a state where a voltage is applied so that the director of the liquid crystal and the direction of the electric field by the applied voltage are substantially horizontal, and the vertical dielectric constant ($\varepsilon\perp$) means a dielectric constant value measured along the direction of an electric field in a state where a voltage is applied so that the director of the liquid crystal and the direction of the electric field by the applied voltage are substantially perpendicular.

The light modulation layer may comprise, for example, a liquid crystal compound having refractive index anisotropy ($\Delta n$) in a range of about 0.04 to 0.15, or the light modulation layer may exhibit the above-mentioned refractive index anisotropy. In another example, the refractive index anisotropy ($\Delta n$) may be about 0.14 or less, 0.13 or less, 0.12 or less, 0.11 or less, or 0.1 or less, or may be 0.05 or more, 0.06 or more, or 0.07 or more.

The light modulation layer may also have, for example, an average refractive index in a range of 1.0 to 2.0. In another example, the average refractive index may be 1.1 or more, 1.2 or more, 1.3 or more, 1.4 or more, or 1.5 or more, or may be 1.9 or less, 1.8 or less, 1.7 or less, or 1.6 or less.

The driving mode of the light modulation layer may be, for example, a reversed TN (twisted nematic) mode, a reversed STN (super twisted nematic) mode, a VA (vertical alignment) mode, a MVA (multi-domain vertical alignment) mode, a PVA (patterned vertical alignment) mode, an HAN (hybrid aligned nematic) mode, or the like.

The light modulation layer of the present disclosure may further comprise a dichroic dye together with the liquid crystal compound in terms of adjusting light transmittance variable characteristics. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region. Such a dye is known, for example, as an azo dye or an anthraquinone dye, and the like, but is not limited thereto.

In one example, the light modulation layer is a liquid crystal layer comprising liquid crystal and dichroic dyes, which may be a so-called guest host liquid crystal layer (guest host liquid crystal cell). The term "GHLC layer" may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted.

The ratio of the dichroic dye included in the guest host liquid crystal layer is not particularly limited, which may be set in an appropriate range in consideration of the desired transmittance. In general, in consideration of the miscibility of the dichroic dye and the liquid crystal compound, the dichroic dye may be included in the light modulation layer in a ratio of about 0.1 weight % to about 4 weight %.

For example, the present disclosure may be directed to a device designed so that by adjusting the arrangement of the liquid crystal compound in the light modulation layer, the initial orientation is vertical orientation and the vertically oriented state is capable of being changed to a horizontally oriented state by application of an external signal. Also, the horizontal orientation may be twisted orientation. Here, the initial orientation is an oriented state when no external signal is applied to the light modulation layer. In this specification, the term vertical orientation is a state where the director of the light modulation layer or the director of the liquid crystal compound in the light modulation layer is arranged to be substantially perpendicular to the plane of the light modulation layer, and for example, the angle formed by the z-axis, which is the normal of the reference plane of the light modulation layer, and the director may be in a range of about 80 degrees to 100 degrees or 85 degrees to 95 degrees, or may be about 90 degrees or so. In addition, the term horizontal orientation may mean a state where the director of the light modulation layer or the director of the liquid crystal compound in the light modulation layer is arranged to be substantially parallel to the reference plane of the light modulation layer, and for example, the angle formed by the director and the reference plane of the light modulation layer may be in a range of about 0 degrees to 10 degrees or about 0 degrees to 5 degrees, or may be about 0 degrees or so.

In this specification, the term director of light modulation layer or director of liquid crystal compound may mean an optical axis or a slow axis of the light modulation layer. For example, the optical axis or the slow axis may mean a long axis direction when the liquid crystal molecules are in a rod shape, and may mean an axis in the normal direction of a discotic plane when the liquid crystal molecules are in a discotic shape, and when a plurality of liquid crystal compounds having different directors are included in the light modulation layer, it may mean a vector sum of the directors of the liquid crystal compounds.

For example, the present disclosure may be directed to a device designed so that by adjusting the arrangement of the liquid crystal compound in the light modulation layer, the initial orientation is vertical orientation and the vertically oriented state is capable of being changed to a horizontally oriented state by application of an external signal.

The light modulation layer may be designed to implement, for example, a twisted orientation mode. In this specification, the term twist orientation mode may mean a helical structure in which the directors of the liquid crystal compounds are twisted along an imaginary helical axis and simultaneously oriented to form a layer.

In one example, the twist orientation mode may be implemented in at least a horizontal orientation mode, and the vertical orientation mode may be a state that the directors of the light modulation layer or the directors of the liquid crystal compound in the light modulation layer are arranged approximately perpendicular to the plane of the light modulation layer without twisting. For example, the horizontal twist orientation mode may mean a layered state in which the individual liquid crystal compounds are twisted along the helical axis in a horizontally oriented state.

In the horizontal twist orientation mode, the ratio (d/p) of the thickness (d, cell gap) to the pitch (p) of the light modulation layer may be, for example, 1 or less. If the ratio (d/p) exceeds 1, a phenomenon that the liquid crystal compounds are twisted along the helical axis even in the initial vertical orientation mode may occur and a problem such as a finger domain may occur, and thus the range may be adjusted to the above range, if possible. In another example, the ratio (d/p) may be about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, or about 0.45 or less, or may also be about 0.1 or more, about 0.15 or more, about 0.2 or more, about 0.25 or more, or about 0.3 or more or so. Here, the thickness (d) of the light modulation layer may have the same meaning as the cell gap in the light modulating device.

The pitch (p) of the light modulation layer in the horizontal twist orientation mode may be measured by a measuring method using a wedge cell, and specifically, it may be measured by a method described in Simple method for accurate measurement of the cholesteric pitch using a "stripe-wedge Grandjean-Cano cell of D. Podolskyy, et al. (Liquid Crystals, Vol. 35, No. 7, July 8\2008, 789-791).

The light modulation layer may further comprise a so-called chiral dopant so that the light modulation layer may implement a horizontal twist mode.

The chiral dopant that can be included in the light modulation layer can be used without particular limitation as long as it can induce a desired rotation (twisting) without deteriorating the liquid crystallinity, for example, the nematic regularity. The chiral dopant for inducing rotation in the liquid crystal molecules needs to include at least chirality in the molecular structure. The chiral dopant may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral dopant may be, for example, a low molecular weight compound having a molecular weight of 1,500 or less. As the chiral dopant, commercially available chiral nematic liquid crystals, for example, chiral dopant liquid crystal S811 commercially available from Merck Co., Ltd. or BASF's LC756 may be applied.

The application ratio of the chiral dopant is not particularly limited as long as it can achieve the desired ratio (d/p). Generally, the content (weight %) of the chiral dopant is calculated by an equation of 100/(HTP (helical twisting power)×pitch (nm)), which may be selected in an appropriate ratio in consideration of the desired pitch (p). In one example, the chiral dopant may be included such that the pitch (p) is in a range of approximately 10 µm to 50 µm. In another example, the chiral dopant may be included in an appropriate range such that the pitch is approximately 11 µm or more, 12 µm or more, 13 µm or more, 14 µm or more, 15 µm or more, 16 µm or more, 17 µm or more, 18 µm or more, or 19 µm or more, or is 45 µm or less, 40 µm or less, 35 µm or less, 30 µm or less, 25 µm or less, 24 µm or less, 23 µm or less, 22 µm or less, or 21 µm.

The thickness of the light modulation layer of the present disclosure may be appropriately selected in consideration of the object of the present disclosure. In one example, the thickness of the light modulation layer may be about 15 µm or less. By controlling the thickness in this way, a device having a large transmittance difference in the transparent mode and the black mode, that is, a device having excellent transmittance-variable characteristics can be implemented. In another example, the thickness may be about 14 µm or less, 13 µm or less, 12 µm or less, 11 µm or less, 10 µm or less, 9 µm or less, 8 µm or less, or 7 µm or less, or may be 1 µm or more, 2 µm or more, 3 µm or more, 4 µm or more, or 5 µm or more, but is not limited thereto.

The present disclosure can provide a light modulating device, in which the omnidirectional light leakage in the black mode is controlled, while having excellent transmittance variable properties and also having excellent mechanical properties by introducing the light modulation layer as above together with the retardation film and/or the optically anisotropy layer as described above at an appropriate position.

The light modulating device of the present disclosure may comprise, for example, an adhesive layer or a pressure-sensitive adhesive layer on the first surface of the first substrate. In one example, the adhesive layer or pressure-sensitive adhesive layer may comprise an adhesive or pressure-sensitive adhesive having vertical orientation force. In this specification, the term adhesive or pressure-sensitive adhesive having vertical orientation force may mean a material having both adhesive force (or pressure-sensitive adhesive force) and vertical orientation force to liquid crystal molecules.

In the present disclosure, as the adhesive or pressure-sensitive adhesive having vertical orientation force, for example, a silicone adhesive or a silicone pressure-sensitive adhesive may be used. As the silicone adhesive or silicone pressure-sensitive adhesive, a cured product of a composition containing a curable silicone compound may be used. The type of the curable silicone compound is not particularly limited, and for example, a heat-curable silicone compound or an ultraviolet curable silicone compound may be used.

In one example, the curable silicone composition is an addition-curable silicone composition, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst such as a platinum catalyst.

The (1) organopolysiloxane comprises, as a main component constituting the silicone cured product, at least two alkenyl groups in one molecule. At this time, a specific example of the alkenyl group includes a vinyl group, an allyl group, a butenyl group, a pentenyl group, a hexenyl group or a heptenyl group, and the like, and a vinyl group of the foregoing is usually applied, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) organopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like, and a methyl group or a phenyl group of the foregoing is usually applied, but is not limited thereto.

The molecular structure of the (1) organopolysiloxane is not particularly limited, which may also have any shape, such as linear, branched, cyclic, reticulated or linear with partially branched. One having a linear molecular structure among such molecular structures is usually applied, but is not limited thereto.

A more specific example of the (1) organopolysiloxane may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1_2SiO_{2/2}$ and a siloxane unit represented by $R^1_2R^2SiO_{1/2}$ and a siloxane unit represented by $SiO_{4/2}$, an organopolysiloxane copolymer comprising a siloxane unit represented by $R^1_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is not limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group, or a 3,3,3-trifluoropropyl group, and the like. In addition, here, R2 is an alkenyl group, which may be, specifically, a vinyl group, an allyl group, a butenyl group, a pentenyl group, a hexenyl group or a heptenyl group, and the like.

In the addition-curable silicone composition, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is usually applied, but is not limited thereto.

The molecular structure of the (2) organopolysiloxane is not particularly limited, and may also have any shape, such as linear, branched, cyclic, reticulated, or linear with partially branched. One having a linear molecular structure among such molecular structures is usually applied, but is not limited thereto.

A more specific example of the (2) organopolysiloxane may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1_3SiO_{1/2}$, a siloxane unit represented by $R^1_2HSiO_{1/2}$ and a siloxane unit represented by $SiO_{4/2}$, an organopolysiloxane copolymer comprising a siloxane unit represented by $R^1_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

The content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. In such a range, curing can be sufficiently performed and heat resistance can be secured.

The addition-curable silicone composition may further comprise platinum or a platinum compound as a catalyst for curing. The specific type of this platinum or platinum compound is not particularly limited. The ratio of the catalyst may also be adjusted to a level that proper curing may be performed.

In addition, the addition-curable silicone composition may also comprise an appropriate additive required from the viewpoint of improving storage stability, handling properties and workability in an appropriate ratio.

In another example, the silicone composition may comprise, as a condensation-curable silicone composition, for example, (a) an alkoxy group-containing siloxane polymer; and (b) a hydroxyl group-containing siloxane polymer.

The (a) siloxane polymer may be, for example, a compound represented by Formula 1 below.

 [Formula 1]

In Formula 1, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+c×2+d is 4.

In the definition of Formula 1, the monovalent hydrocarbon group may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1, the monovalent hydrocarbon group may be substituted with a known substituent such as a halogen, an amino group, a mercapto group, an isocyanate group, a glycidyl group, a glycidoxy group or a ureido group.

In the definition of Formula 1, an example of the alkyl group of $R^3$ may include a methyl group, an ethyl group, a propyl group, an isopropyl group or a butyl group, and the like. Among these alkyl groups, a methyl group or an ethyl group, and the like is usually applied, but is not limited thereto.

Among the polymers of Formula 1, a branched or tertiary crosslinked siloxane polymer may be used. Furthermore, in this (a) siloxane polymer, a hydroxyl group may remain within a range that does not impair the object, specifically within a range that does not inhibit the dealcoholization reaction.

The (a) siloxane polymer may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer, for example, a commercially available organosiloxane polymer such as Shin-Etsu Silicone's X40-9220 or X40-9225, or GE Toray Silicone's XR31-B1410, XR31-B0270 or XR31-B2733 may be used.

As the (b) hydroxyl group-containing siloxane polymer contained in the condensation-curable silicone composition, for example, a compound represented by the following formula (2) may be used.

[Formula 2]

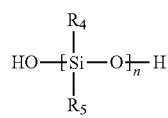

In Formula 2, $R^4$ and $R^5$ each independently represent a hydrogen atom or a substituted or unsubstituted monovalent hydrocarbon group, where when a plurality of $R^4$ and $R^5$ are present, they may be the same or different from each other, and n represents an integer of 5 to 2,000.

In the definition of Formula 2, the specific type of the monovalent hydrocarbon group may include, for example, the same hydrocarbon group as the case of Formula 1 above.

The (b) siloxane polymer may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used.

The above-described addition-curing or condensation-curing silicone composition is an example of a material for forming the silicone pressure-sensitive adhesive or adhesive applied in the present disclosure. That is, basically, all silicone pressure-sensitive adhesives or adhesives known as OCA or OCR, and the like in the industry can be applied in the present disclosure.

The type of the pressure-sensitive adhesive or adhesive or the curable composition forming the same is not particularly limited, which may be appropriately selected according to the intended use. For example, a solid, semi-solid or liquid pressure-sensitive adhesive or adhesive or curable composition may be used. The solid or semi-solid pressure-sensitive adhesive or adhesive or curable composition may be cured before the adhesion (or cohesion) object is bonded. The liquid pressure-sensitive adhesive or adhesive or curable composition is referred to as a so-called optical clear resin (OCR), which may be cured after the adhesion or cohesion object is bonded. According to one example, as the pressure-sensitive adhesive or adhesive or curable composition, a so-called polydimethyl siloxane-based pressure-sensitive adhesive or adhesive or curable composition or polymethylvinyl siloxane-based pressure-sensitive adhesive or adhesive or curable composition or alkoxysilicone-based pressure-sensitive adhesive or adhesive or curable composition may be used, without being limited thereto.

The thickness of the pressure-sensitive adhesive layer or adhesive layer is not particularly limited, which may be selected in an appropriate range for securing a desired adhesion or cohesion. The thickness may be in the range of approximately 1 μm to 50 μm. In another example, the thickness may be 2 μm or more, 3 μm or more, 4 μm or more, 5 μm or more, 6 μm or more, 7 μm or more, 8 μm or more, or 9 μm or more, or may also be 45 μm or less, 40 μm or less, 35 μm or less, 30 μm or less, 25 μm or less, 20 μm or less, or 15 μm or less or so.

By comprising the adhesive layer or pressure-sensitive adhesive layer as above under the arrangement as above, the roll-to-roll process can be applied and thus it is possible to provide a light modulating device, in which the light leakage in the black mode can be particularly controlled to represent excellent optical properties, while having excellent processability and also having excellent adhesive force (or pressure-sensitive adhesive force).

The omnidirectional side light leakage can be effectively suppressed upon the vertical orientation of the liquid crystal compound and the absorption of front light can be minimized upon the horizontal orientation, by the combination of the orientation of the liquid crystal compound formed by the known vertical alignment film and the adhesive or pressure-sensitive adhesive having vertical orientation ability as such, the retardation film and/or the optically anisotropic layer as described above, and the like.

The present disclosure may relate to, for example, a light modulating device in which a liquid crystal alignment film is formed on a first surface of a second substrate. The liquid crystal alignment film may be used to determine the initial orientation of the light modulation layer, which may be, for example, a vertical alignment film. In addition, the type of the liquid crystal alignment film is not particularly limited, which may be, for example, a known rubbing alignment film or a photo-alignment film.

The orientation direction of the liquid crystal alignment film may be a rubbing direction in the case of a rubbing alignment film, and a direction of polarized light to be irradiated in the case of a photo-alignment film, where such an orientation direction may be confirmed by a detection method using a linear polarizer. For example, in the case where the light modulation layer is in a twist orientation mode such as a reversed TN (twisted nematic) mode, as a linear polarizer is disposed on one side and transmittance is measured while changing the absorption axis of the polarizer, the transmittance tends to be low when the absorption axis or transmission axis and the orientation direction of the liquid crystal alignment film coincide, where the orientation direction can be confirmed through simulation reflecting the refractive index anisotropy of the applied liquid crystal compound, and the like. A method of confirming the orientation direction of the liquid crystal alignment film according to the mode of the light modulation layer is known. In addition, as described above, a known rubbing alignment film or photo-alignment film, and the like may be applied as the liquid crystal alignment film, and the type of alignment film that may be applied according to a desired mode is known.

In the present disclosure, the thickness of the liquid crystal alignment film may be, for example, in a range of 50 nm to 150 nm. In another example, the thickness of the liquid crystal alignment film may be 60 nm or more, 70 nm or more, 80 nm or more, or 90 nm or more, or may be 140 nm or less, 130 nm or less, 120 nm or 110 nm or less.

In one example of the present disclosure, when the adhesive layer or the pressure-sensitive adhesive layer having vertical orientation force as above is formed on one side of the first substrate, no liquid crystal alignment film may also be formed on the first substrate. Through such a configuration, it allows for application to the roll-to-roll process, whereby it is possible to secure excellent processability and the like.

In the present disclosure, a gap between the first and second substrates disposed opposite to each other may be maintained by spacers in the form of a partition wall. In one example, as shown in FIG. 1, the first polarization layer (101)/first substrate (201)/optically anisotropic layer (700)/adhesive layer or pressure-sensitive adhesive layer (400)/light modulation layer (300)/liquid crystal alignment film (500)/second substrate (202)/retardation film (600)/second polarization layer (102) are sequentially formed, or as shown in FIG. 2, while the first polarization layer (101)/retardation film (600)/first substrate (201)/optically anisotropic layer (700)/adhesive layer or pressure-sensitive adhesive layer (400)/light modulation layer (300)/liquid crystal alignment film (500)/second substrate (202)/second polarization layer (102) are sequentially formed, the gap (G) between the first and second substrates may be maintained by the partition wall-shaped spacers (800). At this time, the light modulation layer (300) may exist in a region where the spacers (800) do not exist, but is not limited thereto.

In the present disclosure, the shape and arrangement of the spacers may be appropriately designed, for example, within a range capable of maintaining a certain interval between the second substrate and the first substrate.

The spacer of the present disclosure may exist so as to form sections by the partition shape, or may also exist so that two or more pillar shapes are spaced apart, but is not limited thereto. In one example, the spacer may have a tetragonal, triangular or honeycomb partition shape. In terms of effectively controlling the light leakage in the black mode, a tetragonal partition shape may be appropriate, and a square or rectangular partition shape may be appropriate, but is not limited thereto.

In the present disclosure, the arrangement manners of the spacers, for example, pitch, line width, height, and area ratio in the upper part or second substrate, and the like may be appropriately selected within the range without impairing the object of the present disclosure. Here, the area ratio means the percentage of the area in which the spacers are formed relative to the total area of the first surface of the second substrate.

In this specification, the term pitch means an interval between sides that face each other or an interval between a vertex and a side that face each other, which is identified when the spacer is observed from the top. In this specification, the matter that the spacer is observed from the top means that the spacer is observed parallel to the normal direction of the surface of the polymer film substrate formed with the spacer. In one example, when the spacer has a triangular partition shape, the term pitch may mean a vertical distance between a vertex of a triangle and a side facing the vertex. In another example, when it has a tetragonal partition shape, the term pitch may mean the length of each side of the tetragon, and when the lengths of the respective sides of the tetragon are all the same (i.e., when the tetragon is a square), the same length of the side can be defined as the pitch, and when the lengths of the respective sides are not the same (for example, when the tetragon is a rectangle), the arithmetic mean of the lengths of all sides can be defined as the pitch. In another example, when the spacer has a partition shape of a honeycomb (in case of a hexagon), the term pitch may mean the interval of the facing sides of the hexagon, and when the intervals of the facing sides are all the same, the length of the same interval of the sides can be defined as the pitch, and when the respective intervals of the sides are not the same, the arithmetic mean of the lengths of all the intervals of the sides can be defined as the pitch.

In the present disclosure, the pitch of the spacer may be, for example, 50 μm to 500 μm, and in another example, it may be 100 μm or more, 150 μm or more, 200 μm or more, 250 μm or more, or 300 μm or more, or may be 450 μm or less, or 400 μm or less.

In this specification, the term line width means a dimension identified in the direction perpendicular to the longitudinal direction of the partition when the spacer is observed from the top. The line width of the spacer may be, for example, 1 μm to 50 μm, and in another example, it may be 2 μm or more, 3 μm or more, 4 μm or more, 5 μm or more, 6 μm or more, 7 μm or more, 8 μm or more, or 9 μm or more, or may be 45 μm or less, 40 μm or less, 35 μm or less, 30 μm or less, 25 μm or less, 20 μm or less, 19 μm or less, 18 μm or less, 17 μm or less, 16 μm or less, 15 μm or less, 14 μm or less, 13 μm or less, 12 μm or less, or 11 μm or less.

Also, generally, the term height of spacer approximately matches the thickness (cell gap) of the light modulation layer, and means the dimension of the spacer measured in the normal direction of the surface of the polymer film substrate as mentioned above. In the present disclosure, the height of the spacer may be adjusted in consideration of the interval between the first substrate and the second substrate. For example, the height of the spacer may be 1 μm to 20 μm, and in another example, it may be 2 μm or more, 3 μm or more, 4 μm or more, or 5 μm or more, or may be 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, or 7 μm or less. In one example, the height of the spacer may be approximately the same as the thickness of the light modulation layer.

In this specification, when the area of the polymer film substrate is A and the area where the spacer is formed is B, the term area ratio means a value obtained by multiplying the ratio of the area (B) where the spacer is formed among the area (A) of the polymer film substrate by 100, that is, 100×B/A. In the present disclosure, the area ratio of the spacer may be about 0.1% to 50% with respect to the first or second polymer film substrate. In the present disclosure, as the area ratio of the spacer increases, the adhesive force (or pressure-sensitive adhesive force) of the first and second polymer film substrates may increase. In another example, it may be 1% or more, 2% or more, 3% or more, 4% or more, 5% or more, 6% or more, 7% or more, or 8% or more, or may be 45% or less, 40% or less, 35% or less, 30% or less, 25% or less, 20% or less, 15% or less, or 10% or less.

In the present disclosure, the spacer may comprise, for example, a curable resin. The curable resin may be, for example, a heat-curable resin or a photocurable resin, such as an ultraviolet curable resin, but is not limited thereto. The heat-curable resin may be, for example, a silicone resin, a silicon resin, a furan resin, a polyurethane resin, an epoxy resin, an amino resin, a phenol resin, a urea resin, a polyester resin or a melamine resin, and the like, but is not limited thereto. As the ultraviolet curable resin, typically, an acrylic polymer, for example, a polyester acrylate polymer, a polystyrene acrylate polymer, an epoxy acrylate polymer, a polyurethane acrylate polymer, a polybutadiene acrylate polymer, a silicone acrylate polymer or an alkyl acrylate polymer, and the like may be used, without being limited thereto. In one example, the spacer may be formed using an acrylic polymer, more specifically a polyester-based acrylate polymer, but is not limited thereto, and in another example, it may also be formed using a silicone polymer. When the spacer is formed using a silicone polymer, the silicone polymer remaining in the concave region of the spacer may serve as a vertical alignment film, so that as described above, no additional liquid crystal alignment film may also be used on the substrate where the spacers are present. As the silicone polymer, a known polymer having bonds of silicon and oxygen (Si—O—Si) as a main axis, for example, polydimethylsiloxane (PDMS) may be used, without being limited thereto.

By controlling the shape and/or arrangement manner of the spacers as above, the present disclosure can provide a light modulating device in which the cell gap is properly maintained, the adhesive force (or pressure-sensitive adhesive force) of the upper and lower film substrates is excellent and light leakage in the black mode is also properly controlled.

The present inventors have confirmed that omnidirectional light leakage in the black mode can be particularly effectively controlled by appropriately controlling the arrangement relationship between the respective axes of the polarization layer, the polymer film, the retardation film and/or the liquid crystal aligning film together with the above contents. In this specification, the axis may mean, for example, an absorption axis of a polarization layer, a slow axis of a polymer film or retardation film, or an orientation direction of a liquid crystal alignment film, and the like.

The first and second polarization layers of the present disclosure may be disposed, for example, so that their absorption axes are perpendicular to each other, and/or the first and second polymer films may be disposed, for example, so that their slow axes are horizontal to each other.

The absorption axis of the first and/or second polarization layer of the present disclosure and the slow axis of the first and/or second polymer film may also be disposed to be perpendicular or horizontal to each other. In one example, if the absorption axes of the first and second polarization layers are disposed to be perpendicular to each other and the slow axes of the first and second polymer films are disposed to be horizontal to each other, any one absorption axis of the first and second polarization layers and the slow axes of the first and second polymer films may be perpendicular to each other, and the other absorption axis of the first and second polarization layers and the slow axes of the first and second polymer films may be disposed to be horizontal to each other.

The light modulating device of the present disclosure can effectively control a light distortion phenomenon such as a rainbow by disposing the retardation film and the like as described below while disposing the polarization layer and/or the polymer film as described above.

The retardation film of the present disclosure may be disposed such that, for example, the slow axis of the retardation film and the slow axis of the first and/or second polymer film are perpendicular to each other. In one example, if the slow axes of the first and/or second polymer films are disposed to be horizontal to each other, the slow axis of the retardation film may be disposed to be perpendicular to each of the slow axes of the first and second polymer films.

The retardation film of the present disclosure may be disposed such that, for example, the slow axis of the retardation film is perpendicular to an absorption axis of a polarization layer adjacent to the retardation film. In this specification, the meaning of the polarization layer adjacent to the retardation film may also be, for example, a polarization layer formed in direct contact with the retardation film, and may also mean a polarization layer disposed closer to the retardation film among the first and second polarization layers, which are not formed in direct contact with the retardation film, but are introduced into the structure of the light modulating device. In one example, in the case of the light modulating device having the structure as shown in FIG. 1, the polarization layer adjacent to the retardation film may be the second polarization layer. Therefore, in the case of the light modulating device as shown in FIG. 1, the slow axis of the retardation film may be disposed to be perpendicular to the absorption axis of the second polarization layer. In another example, in the case of the light modulating device having the structure shown in FIG. 2, the polarization layer adjacent to the retardation film may be the first polarization layer. Therefore, in the case of the light modulating device as shown in FIG. 2, the slow axis of the retardation film may be disposed to be perpendicular to the absorption axis of the first polarization layer.

The liquid crystal alignment film of the present disclosure may be disposed such that, for example, the orientation direction thereof is horizontal or perpendicular to the slow axis of the first and/or second polymer film. The orientation direction of the liquid crystal alignment film may be, for example, a rubbing direction in the case of a rubbing alignment film, or a direction of polarized light to be irradiated in the case of a photo-alignment film. In one example, if the slow axes of the first and second polymer films are disposed to be horizontal to each other, the liquid crystal alignment film may be disposed such that the orientation direction thereof is horizontal or perpendicular to each of the slow axes of the first and second polymer films. However, while the slow axes of the first and second polymer films are disposed to be horizontal to each other, it may be more preferable in terms of optical properties that the liquid crystal aligning film is disposed such that the orientation direction thereof is perpendicular to each of the slow axes of the first and second polymer films, but is not limited thereto.

The light modulating device of the present disclosure can particularly control omnidirectional light leakage in the black mode, while having excellent transmittance variable characteristics, by disposing a polarization layer, a polymer film, a retardation film, an optically anisotropic layer, a light modulation layer and/or a liquid crystal alignment film, which have the above characteristics, at appropriate positions and controlling the relationship between the axes of the respective layers as described above.

In one example, the light modulating device of the present disclosure may have transmittance in the black mode of 60% or less, 55% or less, 50% or less, 45% or less, 40% or less, 35% or less, 30% or less, 25% or less, 20% or less, 15% or less, 10% or less, 5% or less, 4% or less, 3% or less, 2% or less, 1% or less, 0.9% or less, 0.8% or less, 0.7% or less, 0.6% or less, 0.5% or less, 0.4% or less, or 0.3% or less. In the black mode, the lower the transmittance is, the more advantageous it is, so that the lower limit of the transmittance in the black mode state is not particularly limited, and in one example, the lower limit of the transmittance in the black mode state may be about 0%.

In one example, the light modulating device of the present disclosure may have transmittance in the transparent mode of 20% or more, and in another example, it may be 21% or more, 22% or more, 23% or more, or 24% or more or so. The upper limit of the transmittance in the transparent mode state is not particularly limited, but in one example, the upper limit of the transmittance in the transparent mode state may be 60%, and in another example, it may be 55% or less, 50% or less, 45% or less, 40% or less, 35% or less, or 30% or less or so.

In one example, the transmittance difference in the transparent mode and black mode states may be 15% or more, 16% or more, 17% or more, 18% or more, 19% or more, 20% or more, 21% or more, 22% or more, 23% or more, or 24% or more, or may be 90% or less, 85% or less, 80% or less, 75% or less, 70% or less, 65% or less, 60% or less, 55% or less, 50% or less, 45% or less, 40% or less, 35% or less, 30% or less, or 25% or less.

The transmittance may be, for example, linear light transmittance. The linear light transmittance may be a percentage of the ratio of the light transmitted in the same direction as the incident direction to the light incident on the light modulating device. For example, if the device is in the form of a film or sheet, the percentage of the light transmitted through the device in the direction parallel to the normal direction among the light incident in a direction parallel to the z-axis direction, which is the normal direction of the film or sheet surface, may be defined as the transmittance.

The transmittance or reflectance may be each transmittance or reflectance for any one wavelength in the visible light region, for example, any one wavelength in a range of about 400 nm to 700 nm or about 380 nm to 780 nm, or transmittance or reflectance for the entire visible light region, maximum or minimum transmittance or reflectance among the transmittance or reflectance for the entire visible light region, or an average value of the transmittance or an average value of the reflectance in the visible region. In another example, the transmittance may be transmittance for light having a wavelength of about 550 nm.

In one example, the light modulating device of the present disclosure may have inclination angle transmittance of 3% or less in the black mode. In this specification, the inclination angle transmittance may mean a value that measures the transmittance of the light transmitted through the measurement object parallel to the direction of the axis where the inclination angle from the z-axis direction, which is the normal direction of the reference plane of the measurement object (for example, the reference plane may be a surface of a polarization layer, a polymer film, a retardation film, an optically anisotropic layer or a light modulation layer, and the like in a light modulating device), is $\Theta$, while varying the radial angle $\Phi$. In one example, it may mean the transmittance measured while changing the radial angle $\Phi$ of FIG. 3 to 0 degrees, 45 degrees, 90 degrees, 135 degrees, 180 degrees, 225 degrees, 270 degrees and 315 degrees for 60 degrees (inclination angle $\Theta$ in FIG. 3) with the z-axis direction, which is the normal direction of the reference plane of the measurement object, set to 0 degrees. In the present disclosure, the inclination angle transmittance in the black mode may be, in another example, 2.9% or less, 2.8% or less, or 2.7% or less, or may be 0% or more, 0.5% or more, 1% or more, 1.5% or more, or 2% or more, but is not limited thereto.

The light modulating device of the present disclosure may further comprise a conductive layer on one side of each of the first and second substrates. For example, the conductive layers may be formed between the adhesive layer or the pressure-sensitive adhesive layer and the first substrate and between the liquid crystal alignment film and the second substrate, respectively.

When the conductive layer is formed, the optically anisotropic layer may be disposed between the first substrate and the conductive layer or between the conductive layer and the pressure-sensitive adhesive layer or adhesive layer and/or may be disposed between the second substrate and the conductive layer or between the conductive layer and the liquid crystal alignment film.

The conductive layer may transfer an appropriate electric field to the light modulation layer to switch the alignment of the liquid crystal compound in the light modulation layer. The direction of the electric field may be a vertical or horizontal direction, for example, the thickness direction or the plane direction of the light modulation layer.

The conductive layer may be, for example, a transparent conductive layer, and the transparent conductive layer may be formed by depositing, for example, a conductive polymer, a conductive metal, a conductive nanowire or a metal oxide such as ITO (indium tin oxide), and the like. Besides, various materials and formation methods capable of forming the transparent conductive layer are known, which can be applied without limitation.

Such a light modulating device can be applied to various applications. The applicable application by the light modulating device can be exemplified by openings in closed spaces including buildings, containers or vehicles, such as windows or sunroofs, or eyewear, and the like, or windows and doors, light shielding plates of OLEDs (organic light emitting devices), and the like. Here, in the range of eyewear, all eyewear formed so that an observer can observe the outside through lenses, such as general glasses, sunglasses, sports goggles or helmets, or a wearable device such as an instrument for experiencing virtual reality or augmented reality can be included.

A typical application capable of being applied by the light modulating device of the present disclosure may include a vehicle sunroof.

In one example, the light modulating device per se may be a vehicle sunroof. For example, in a vehicle comprising a vehicle body in which at least one or more openings are formed, the light modulating device or the vehicle sunroof mounted on the opening may be mounted and used.

The sunroof is a fixed or operating (venting or sliding) opening on a ceiling of a vehicle, which may mean collectively a device that can function to allow light or fresh air to enter the interior of the vehicle. In the present disclosure, the method of operating the sunroof is not particularly limited, and for example, it can be manually operated or driven by a motor, where the shape, size or style of the sunroof may be appropriately selected according to the intended use. For example, according to the operation method, the sunroof may be exemplified by a pop-up type sunroof, a spoiler (tile & slide) type sunroof, an inbuilt type sunroof, a folding type sunroof, a top-mounted type sunroof, a panoramic roof system type sunroof, a removable roof panels (t-tops or targa roofs) type sunroof or a solar type sunroof, and the like, but is not limited thereto.

An exemplary sunroof of the present disclosure may comprise the light modulating device of the present disclosure, and in this case, as for the details of the light modulating device, the contents described in the items of the light modulating device may be equally applied.

Effects of Invention

The present disclosure relates to a light modulating device. The present disclosure can provide a light modulating device applicable to various applications by controlling omnidirectional light leakage in a black mode while having excellent optical properties such as transmittance variable properties and mechanical properties, and the like.

EXPLANATION OF REFERENCE NUMERALS

101, 102: first and second polarization layers
201, 202: first and second substrates
400: adhesive layer or pressure-sensitive adhesive layer
500: liquid crystal alignment film
300: light modulation layer
800: spacer
600: retardation film
700: optically anisotropic layer
G: cell gap

MODE FOR INVENTION

Hereinafter, the present disclosure will be described in detail through Examples, but the scope of the present disclosure is not limited by Examples below.

Evaluation Example 1. Measurement of Transmittance in Black Mode

The transmittance in the black mode (no voltage applied, 0V) was measured using a haze meter (NDH5000SP, Sekos) according to ASTM D1003 standard.

Specifically, when light with a wavelength of 380 nm to 780 nm is incident on the measurement object in the integrating sphere, the incident light is divided into diffused light (DT, sum of the entire diffused and emitted light) and straight light (PT, light emitted from the front direction excluding diffused light) by the measurement object. The diffused light and the straight light can each be measured by condensing them on the light receiving element in the integrating sphere. That is, by the above process, the total transmitted light (TT) can be defined as the sum (DT+PT) of the diffused light (DT) and the straight light (PT). The total transmitted light means total transmittance.

Meanwhile, the maximum values of the transmittance of the inclination angles in the black mode (0V) for the light modulating devices were set to the largest values among the values obtained by measuring the omnidirectional transmittance with respect to the inclination angle of 60° without applying voltage to the light modulating devices. While the z-axis direction as the normal direction of the reference plane of the measurement object (for example, the reference plane may be a surface of a polarization layer, a polymer film, a retardation film, an optically anisotropic layer or a light modulation layer, and the like in a light modulating device) was set to 0 degrees and the radial angles Φ of FIG. 3 were changed to 0 degrees, 30 degrees, 60 degrees, 90 degrees, 120 degrees, 150 degrees, 180 degrees, 210 degrees, 240 degrees, 270 degrees, 300 degrees and 330 degrees with regard to 60 degrees (the inclination angles Θ in FIG. 3), the largest values of the measured results were shown in Table 1.

Evaluation Example 2. In-Plane Phase Difference Evaluation

In-plane phase differences (Rin) of polymer films, retardation films, and the like were measured using Agilent's UV/VIS spectroscope 8453 equipment (based on a wavelength of 550 nm). Two sheets of polarizers were installed in the UV/VIS spectroscope so that their transmission axes were orthogonal to each other, and polymer films, retardation films, and the like were positioned between the two sheets of polarizers so that its slow axis formed 45 degrees with the transmission axes of the two polarizers, respectively, and then the transmittance according to wavelengths was measured. The phase retardation order of each peak was obtained from the transmittance graph according to wavelengths. Specifically, a waveform in the transmittance graph according to wavelengths satisfies Equation A below, and the maximum peak (Tmax) condition in the sine waveform satisfies Equation B below. In the case of λmax in Equation A, since the T of Equation A and the T of Equation B are the same, the equations are expanded. As the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for light with a wavelength of 550 nm is calculated. The function of the linear trend line is Y=ax+b, where a and b are constants. The Y value when 550 nm has been substituted for x of the function is the Rin value for light having a wavelength of 550 nm.

$T=\sin 2[(2\pi R/\lambda)]$ [Equation A]

$T=\sin 2[((2n+1)\pi/2)]$ [Equation B]

$n=(\lambda n-3\lambda n+1)/(2\lambda n+1-2\lambda n)$ [Equation C]

Here, R means an in-plane phase difference (Rin), λ means a wavelength, and n means a nodal degree of a sine waveform.

Evaluation Example 3. Thickness of Each Layer

The thickness of the light modulation layer coincided with the height of the spacer, and the height of the spacer was confirmed using a measuring device (Optical Profiler, Nano System, Nano View-E1000). In addition, the thickness of the optically anisotropic layer was also confirmed using the above measuring equipment (Optical profiler, Nano system, Nano View-E1000).

Meanwhile, the thicknesses of the polarization layer, the retardation film and the adhesive layer (or pressure-sensitive adhesive layer) were measured using a Digimatic thickness gauge (547, Mitutoyo).

Evaluation Example 4. Evaluation of Refractive Index Anisotropy and Average Refractive Index of Light Modulation Layer (Liquid Crystal Layer), Retardation Film or Optically Anisotropic Layer The refractive index anisotropy (Δn) and average refractive index of the light modulation layer, retardation film or optically anisotropic layer are evaluated in the following manner using an Abbe refractometer. If a vertical alignment film is coated on the surfaces of the measuring prism and the illumination prism of the Abbe refractometer, the object to be measured is coated on the measuring prism and then covered with the illumination prism, the light modulation layer, retardation film or optically anisotropic layer is vertically oriented. At this time, the liquid crystal compound applied to the light modulation layer in the above process is only a liquid crystal compound that is not mixed with other materials such as a dichroic dye.

Then, as shown in FIG. 4, when a linear polarizer is applied to the eyepiece side (grounded) and irradiated with light to be observed, θe and θo as shown in FIG. 4 can be obtained and the extraordinary refractive index (ne=np sin θe) and the ordinary refractive index (no=np sin θo) can be obtained through the refractive index (np) of the measuring prism and the angles (θe and θo). Here, the difference (ne−no) may be defined as the refractive index anisotropy, and the average value ((ne+no)/2) may be defined as the average refractive index. The reference wavelength upon measurement is approximately 550 nm.

Example 1

A device was manufactured using stretched PET (polyethylene terephthalate) films (SKC) having thicknesses of 80 μm and 145 μm, respectively, as first and second substrates. The first and second substrates had an in-plane phase difference for light with a wavelength of 550 nm in a range of about 10,000 nm to 15,000 nm.

A −C plate material was bar-coated on the first surface of the first substrate and then cured at about 130° C. for 20 minutes to form an optically anisotropic layer with a thickness of about 2 μm, and subsequently, an ITO (indium tin oxide) film (conductive layer) was deposited on the optically anisotropic layer. The thickness direction phase difference of the optically anisotropic layer for light with a wavelength of 550 nm was about −220 nm or so, the refractive index anisotropy was approximately 0.1, and the average refractive index was 1.65. Here, the −C plate material was prepared by blending a polyamide, in which terephthalic acid, isophthalic acid and 2,2'-bis(trifluoromethyl)-4,4'-biphenyldiamine were polymerized, in a ratio of approximately 5.3 weight % relative to a dimethylacetamide solution.

Subsequently, a silicone pressure-sensitive adhesive (Shinetsu, KR3700) having vertical orientation force was barcoated on the ITO film and then cured at about 150° C. for 10 minutes to form a pressure-sensitive adhesive layer with a thickness of about 10 μm (first polymer film substrate).

First, an ITO (indium tin oxide) film (conductive layer) was deposited on the first surface of the second substrate, and spacers (pitch: 350 μm, height: 6 μm, line width: 10 μm, area ratio: 9%) in the form of a square partition for maintaining a cell gap were formed on the ITO film. Thereafter, a polyimide-based vertical alignment film (SE-5661LB3, Nissan) having a thickness of approximately 100 nm was formed for initial orientation control of the light modulation layer (liquid crystal layer), and then subjected to rubbing with a rubbing cloth. At this time, the rubbing direction was made to be perpendicular to the slow axes of the first and second substrates (second polymer film substrate).

Subsequently, the pressure-sensitive adhesive layer of the first polymer film substrate and the vertical alignment film of the second polymer film substrate were disposed to face each other (cell gap: 6 μm), and a liquid crystal material was injected therein, and then a device was manufactured through a lamination process. As the liquid crystal material, a composition that a chiral dopant (S811, Merck) was mixed with a liquid crystal compound (MAT-19-1261, Merck) having negative dielectric constant anisotropy with refractive index anisotropy (Δn) of approximately 0.07 and an average refractive index of approximately 1.58 was used. At this time, about 0.58 parts by weight of the chiral dopant was mixed with respect to 100 parts by weight of the liquid crystal compound, so that the chiral pitch was approximately 20 μm or so.

Subsequently, a first polarization layer was attached to the second surface of the first polymer film on which the optically anisotropic layer was not formed, and a retardation film was attached to the second surface of the second polymer film on which the ITO film (conductive layer) was not formed. At this time, as the retardation film, an A plate (LG CHEM) having an in-plane phase difference of 275 nm for light with a wavelength of 550 nm and a thickness direction phase difference of approximately 0 nm for light with a wavelength of 550 nm was used. The thickness of the retardation film was approximately 45 μm, the refractive index anisotropy was 0.7, and the average refractive index was 1.55.

Subsequently, a second polarization layer was formed on the second surface of the retardation film, which was the surface to which the second polymer film was not attached. A general PVA polarization layer was used as the first and second polarization layers, and the thicknesses thereof were each 140 μm.

Upon the arrangement, the arrangement was made such that the slow axes of the first and second substrates were horizontal to each other, the absorption axes of the first and second polarization layers were perpendicular to each other, and the absorption axis of the first polarization layer was horizontal to the slow axes of the first and second substrates. In addition, the arrangement was made such that the slow axis of the retardation film and the absorption axis of the second polarization layer, which was a polarization layer adjacent to the retardation film, were perpendicular to each other.

As a result, the light modulating device having the structure of the first polarization layer/first substrate/–C plate/ITO film/pressure-sensitive adhesive layer/light modulation layer (liquid crystal layer)/vertical alignment film/ITO film/second substrate/retardation film/second polarization layer was formed.

Example 2

A device was manufactured using stretched PET (polyethylene terephthalate) films (SKC) having thicknesses of 80 μm and 145 μm, respectively, as first and second substrates. The first and second substrates had an in-plane phase difference for light with a wavelength of 550 nm in a range of about 10,000 nm to 15,000 nm.

A retardation film was attached to one side of the first substrate. At this time, as the retardation film, an A plate (LG CHEM) having an in-plane phase difference of 275 nm for light with a wavelength of 550 nm and a thickness direction phase difference of approximately 0 nm for light with a wavelength of 550 nm was used. The thickness of the retardation film was approximately 45 μm, the refractive index anisotropy was 0.7, and the average refractive index was 1.55.

Subsequently, a –C plate material was bar-coated on the first surface of the first substrate, which was the other side to which the retardation film was not attached, and then cured at about 130° C. for 20 minutes to form an optically anisotropic layer with a thickness of about 2 μm, and subsequently, an ITO (indium tin oxide) film (conductive layer) was deposited on the first surface of the optically anisotropic layer. The thickness direction phase difference of the optically anisotropic layer for light with a wavelength of 550 nm was about –220 nm or so, the refractive index anisotropy was approximately 0.1, and the average refractive index was 1.65. Here, the –C plate material was prepared by blending a polyamide, in which terephthalic acid, isophthalic acid and 2,2'-bis(trifluoromethyl)-4,4'-biphenyldiamine were polymerized, in a ratio of approximately 5.3 weight % relative to a dimethylacetamide solution.

Subsequently, a silicone pressure-sensitive adhesive (Shinetsu, KR3700) having vertical orientation force was bar-coated on the first surface of the ITO film and then cured at about 150° C. for 10 minutes to form a pressure-sensitive adhesive layer with a thickness of about 10 μm (first polymer film substrate).

First, an ITO (indium tin oxide) film (conductive layer) was deposited on the first surface of the second substrate, and spacers (pitch: 350 μm, height: 6 μm, line width: 10 μm, area ratio: 9%) in the form of a square partition for maintaining a cell gap were formed on the ITO film. Thereafter, a polyimide-based vertical alignment film (SE-5661LB3, Nissan) having a thickness of approximately 100 nm was formed for initial orientation control of the light modulation layer (liquid crystal layer), and then subjected to rubbing with a rubbing cloth. At this time, the rubbing direction was made to be perpendicular to the slow axes of the first and second substrates (second polymer film substrate).

Subsequently, the pressure-sensitive adhesive layer of the first polymer film substrate and the vertical alignment film of the second polymer film substrate were disposed to face each other (cell gap: 6 μm), and a liquid crystal material was injected therein, and then a device was manufactured through a lamination process. As the liquid crystal material, a composition that a chiral dopant (S811, Merck) was mixed with a liquid crystal compound (MAT-19-1261, Merck) having negative dielectric constant anisotropy with refractive index anisotropy (Δn) of approximately 0.07 and an average refractive index of approximately 1.58 was used. At this time, about 0.58 parts by weight of the chiral dopant was mixed with respect to 100 parts by weight of the liquid crystal compound, so that the chiral pitch was approximately 20 μm or so.

Subsequently, the retardation film was attached to the second surface of the first polymer film, which was the surface on which the optically anisotropic layer was not formed, and the first polarization layer was attached to the second surface of the retardation film. A general PVA polarization layer was used as the first and second polarization layers, and the thicknesses thereof were each 140 μm.

Upon the arrangement, the arrangement was made such that the slow axes of the first and second substrates were horizontal to each other, the absorption axes of the first and second polarization layers were perpendicular to each other, and the absorption axis of the first polarization layer was perpendicular to the slow axes of the first and second polymer films. In addition, the arrangement was made such that the slow axis of the retardation film and the absorption axis of the first polarization layer, which was a polarization layer adjacent to the retardation film, were perpendicular to each other.

As a result, the light modulating device having the structure of the first polarization layer/retardation film/first substrate/–C plate/ITO film/pressure-sensitive adhesive layer/light modulation layer (liquid crystal layer)/vertical alignment film/ITO film/second substrate/second polarization layer was formed.

Comparative Example 1

A light modulating device was manufactured in the same manner as in Example 1, except that the light modulating device having the structure of the first polarization layer/first substrate/–C plate/ITO film/pressure-sensitive adhesive layer/light modulation layer (liquid crystal layer)/vertical alignment film/ITO film/second substrate/second polarization layer was manufactured by attaching the second polarization layer in direct contact with the second surface of the second substrate, which was the surface on which the ITO film (conductive layer) was not formed, without attaching the retardation film.

TABLE 1

| | | Classification | | |
|---|---|---|---|---|
| | $\Theta/\Phi$ | Example 1 | Example 2 | Comparative Example 1 |
| Transmittance in black mode (0 V) | 60°/0° | 0.27 | 0.3 | 0.21 |
| | 60°/45° | 2.19 | 2.21 | 5.61 |
| | 60°/90° | 2.14 | 2.13 | 2.21 |
| | 60°/135° | 2.23 | 2.1 | 5.20 |
| | 60°/180° | 0.26 | 0.31 | 0.24 |
| | 60°/225° | 1.82 | 1.79 | 4.39 |
| | 60°/270° | 1.86 | 1.91 | 2.15 |
| | 60°/315° | 2.4 | 2.6 | 5.19 |

In Table 1 above, the inclination angle transmittance in the black mode (0V) represents transmittance measured while changing the radial angle Φ of FIG. 3 to 0 degrees, 45 degrees, 90 degrees, 135 degrees, 180 degrees, 225 degrees, 270 degrees and 315 degrees for 60 degrees (inclination angle Θ in FIG. 3) with the z-axis direction, which is the normal direction of the reference plane of the measurement object (for example, the reference plane may be a surface of a polarization layer, a polymer film, a retardation film, an optically anisotropic layer or a light modulation layer, and the like in a light modulating device), set to 0 degrees, in a state where a voltage is not applied to the light modulating device.

The invention claimed is:

1. A light modulating device, comprising:
a first substrate;
a second substrate;
a light modulation layer;
an optically anisotropic layer;
a first polarization layer;
a second polarization layer; and
a retardation film,
wherein each of the first and second substrates has a first surface and a second surface, wherein the first and second surfaces are disposed opposite to each other,
wherein the first surfaces of the first and second substrates face each other,
wherein the first and second substrates are each anisotropic substrates having an in-plane phase difference of 500 nm or more for light with a wavelength of 550 nm,
wherein the light modulation layer is disposed between the first and second substrates;
wherein the retardation film is formed on the second surface of the first substrate or the second substrate,
wherein the first polarization layer is formed on the second surface of the first substrate or on the retardation film,
wherein the second polarization layer is formed on the second surface of the second substrate or on the retardation film,
wherein the retardation film has an in-plane phase difference in a range of 100 nm to 300 nm for light having a wavelength of 550 nm,
wherein the retardation film is disposed such that the slow axis of the retardation film and the slow axes of the anisotropic substrates are perpendicular or horizontal to each other,
wherein the optically anisotropic layer is disposed between at least one of the light modulation layer and the first substrate or between the light modulation layer and the second substrate, wherein the optically anisotropic layer satisfies Equation 3 below:

$$nz<ny≈nx$$ [Equation 3]

wherein, nx is the refractive index of the optically anisotropic layer for light with a wavelength of 550 nm in the slow axis direction, ny is the refractive index of the optically anisotropic layer for light with a wavelength of 550 nm in the fast axis direction, and nz is the refractive index of the optically anisotropic layer in the thickness direction, and
wherein the slow axis of the retardation film and the absorption axis of the first or second polarization layer that is adjacent to the retardation film are perpendicular to each other.

2. The light modulating device according to claim 1, wherein the retardation film satisfies the following Equation 1 or Equation 2:

$$nx>ny≈nz$$ [Equation 1]

$$nx≈nz>ny$$ [Equation 2]

wherein, nx is the refractive index of the retardation film for light with a wavelength of 550 nm in the slow axis direction, ny is the refractive index of the retardation film for light with a wavelength of 550 nm in the fast axis direction, and nz is the refractive index of the retardation film in the thickness direction.

3. The light modulating device according to claim 1, further comprising:
an adhesive layer or a pressure-sensitive adhesive layer is formed on the first surface of the first substrate; and
a liquid crystal alignment film is formed on the first surface of the second substrate.

4. The light modulating device according to claim 3, wherein the adhesive layer or the pressure-sensitive adhesive layer is a silicone adhesive layer or a silicone pressure-sensitive adhesive layer.

5. The light modulating device according to claim 3, wherein no liquid crystal alignment film is formed on the first substrate.

6. The light modulating device according to claim 3, wherein the liquid crystal alignment film is a vertical alignment film.

7. The light modulating device according to claim 1, wherein absorption axes of the first and second polarization layers are perpendicular to each other.

8. The light modulating device according to claim 1, wherein the slow axes of the first and second substrates are horizontal to each other.

9. The light modulating device according to claim 3, wherein the orientation direction of the liquid crystal alignment film and the slow axes of the first and second substrates are horizontal or perpendicular to each other.

10. The light modulating device according to claim 1, further comprising a partition wall-shaped spacer to maintain a distance between the first and second substrates.

11. The light modulating device according to claim 1, wherein the light modulation layer comprises a liquid crystal compound.

12. The light modulating device according to claim 1, wherein the light modulation layer capable of switching between a vertical orientation mode and a horizontally twisted mode.

13. The light modulating device according to claim 12, wherein a ratio of the thickness d of the light modulation layer to the pitch p of the twisted mode is 1 or less.

14. A window comprising the light modulating device of claim 1.

15. A sunroof comprising the light modulating device of claim 1.

* * * * *